United States Patent [19]

Heckmann et al.

[11] Patent Number: 5,720,110
[45] Date of Patent: Feb. 24, 1998

[54] CONFIGURATION FOR DETECTING GAPS IN A CONDUCTOR RAIL FOR ELECTRIC RAIL VEHICLES BEING FED THROUGH CONDUCTOR RAILS

[75] Inventors: August Heckmann, Weinheim; Erich Minderlein, Vellmar, both of Germany

[73] Assignee: ABB Patent GmbH, Mannheim, Germany

[21] Appl. No.: 550,213

[22] Filed: Oct. 30, 1995

[30] Foreign Application Priority Data

Oct. 29, 1994 [DE] Germany ............... 44 38 720.2

[51] Int. Cl.[6] ............................................... B61K 9/08
[52] U.S. Cl. ................................. 33/1 Q; 33/523.1
[58] Field of Search .......................... 33/501.04, 338, 33/287, 1 Q, 523, 523.1, 523.2

[56] References Cited

U.S. PATENT DOCUMENTS

| | | | |
|---|---|---|---|
| 2,042,614 | 6/1936 | Mauzin | 33/523.2 |
| 2,113,785 | 4/1938 | Drake et al. | 33/523.2 |
| 2,732,625 | 1/1956 | Buisson | 33/501.04 |
| 4,005,601 | 2/1977 | Botello | 33/523.2 |
| 4,625,412 | 12/1986 | Bradshaw | 33/1 Q |
| 4,941,269 | 7/1990 | Mori et al. | 33/501.04 |
| 5,161,312 | 11/1992 | Theurer et al. | 33/501.04 |
| 5,199,176 | 4/1993 | Theurer et al. | 33/1 Q |
| 5,203,089 | 4/1993 | Trefouel et al. | 33/1 Q |

FOREIGN PATENT DOCUMENTS

| | | | |
|---|---|---|---|
| 1014784 | 4/1983 | U.S.S.R. | 33/1 Q |
| 866944 | 5/1961 | United Kingdom | 33/338 |

*Primary Examiner*—Thomas B. Will
*Attorney, Agent, or Firm*—Herbert L. Lerner; Laurence A. Greenberg

[57] ABSTRACT

A configuration for detecting gaps in a conductor rail for electric rail vehicles being fed through conductor rails, includes a proximity switch. A component of a current collector can be pressed against an activation element of the proximity switch if a gap in the conductor rail is present so that a conductor-rail gap signal can be produced in conjunction with an evaluation device, when there is an interrupted conductor rail. Alternatively, a proximity sensor can be used instead of a proximity switch. The proximity sensor can also detect a conductor rail directly without components of the current collector being involved in the detection.

2 Claims, 3 Drawing Sheets

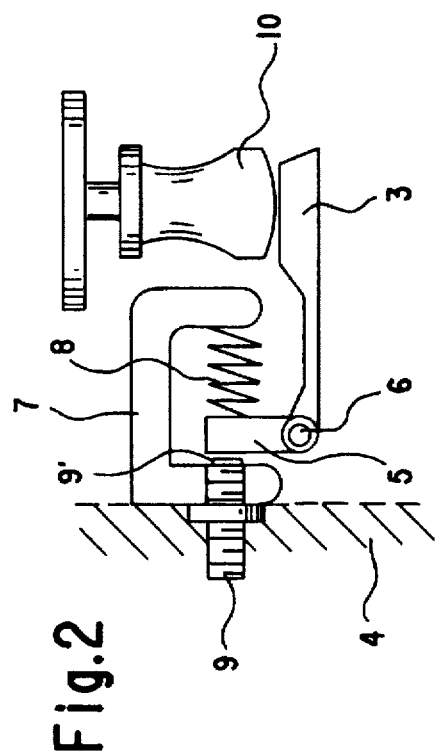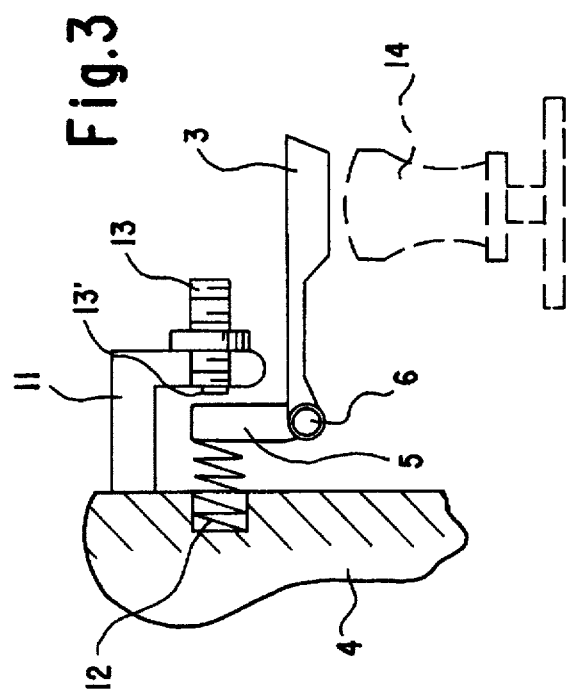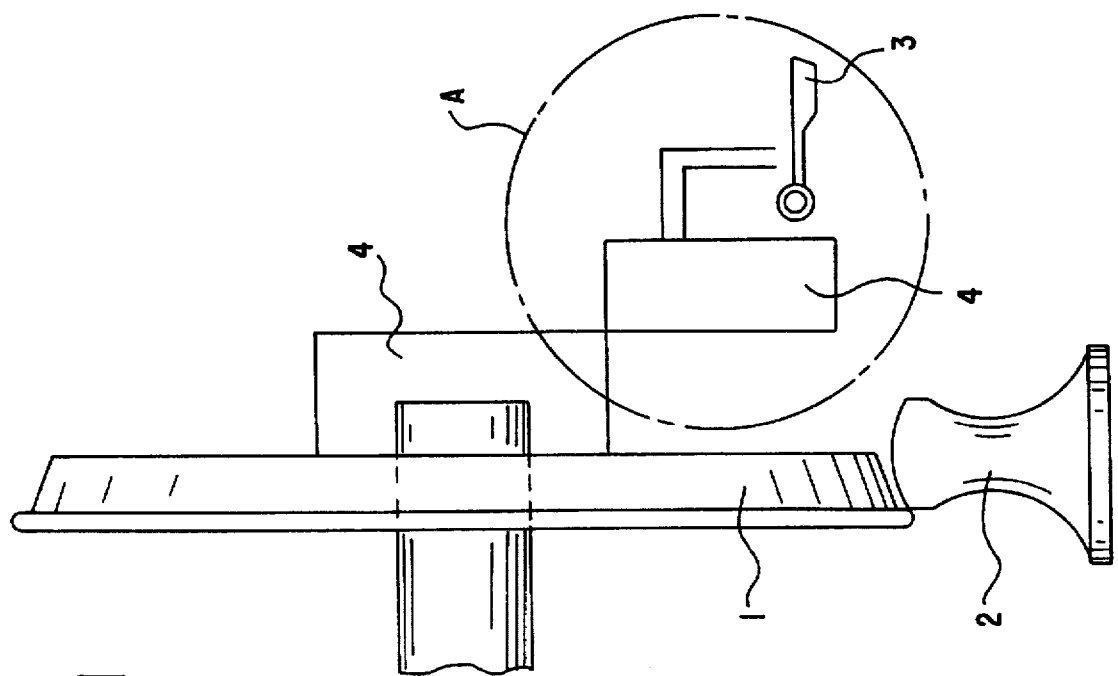

CONFIGURATION FOR DETECTING GAPS IN A CONDUCTOR RAIL FOR ELECTRIC RAIL VEHICLES BEING FED THROUGH CONDUCTOR RAILS

BACKGROUND OF THE INVENTION

1. Field of the Invention

The invention relates to a configuration for detecting gaps in a conductor rail for electric rail vehicles being fed through conductor rails.

In the case of rail vehicles which are fed through a so-called third rail, i.e. conductor rails, serious interruptions in the feeding of power occur, for example in the region of shunts or points, intersections and sectioning points. As a result, in addition to the unavoidable loss of tractive force there is an interruption in the train's power supply which is apparent, for example, in the failure of the lighting. In order to travel over gaps in the conductor rail, which are unavoidable due to the topology of the route, while having minimum interruption of the tractive force and without having an interruption or with only a short interruption of the train's power supply, precise and rapid information on the instantaneous contact between the conductor rail and the current collector is necessary.

2. Summary of the Invention

It is accordingly an object of the invention to provide a configuration for detecting gaps in a conductor rail for electric rail vehicles being fed through conductor rails, which overcomes the hereinafore-mentioned disadvantages of the heretofore-known devices of this general type and which makes it possible to reliably, quickly and exactly detect whether an interruption in the conductor rail occurs momentarily or whether the conductor rail is present without gaps.

With the foregoing and other objects in view there is provided, in accordance with the invention, a configuration for detecting gaps in a conductor rail for electric rail vehicles being fed through conductor rails, comprising a current collector having a component; and a proximity switch having an activation element against which the component of the current collector can be pressed if a gap is present in a conductor rail, for producing a conductor-rail gap signal in conjunction with an evaluation device when a conductor rail is interrupted.

In accordance with another feature of the invention, the component of the current collector is an angular lever being pivotal about an axis of rotation, the activation element of the proximity switch is an activation lever, and there is provided a spring element for pressing the angular lever against the activation lever.

In accordance with a further feature of the invention, there is provided a securing bow for connecting the proximity switch to a component of a vehicle, bogie or truck.

With the objects of the invention in view, there is also provided a configuration for detecting gaps in a conductor rail for electric rail vehicles being fed through conductor rails, comprising a current collector having a component; and a proximity sensor sensing movement of the component of the current collector if a gap is present in a conductor rail, for producing a conductor-rail gap signal in conjunction with an evaluation device when a conductor rail is interrupted.

With the objects of the invention in view, there is additionally provided a configuration for detecting gaps in a conductor rail for electric rail vehicles being fed through conductor rails, comprising a proximity sensor which being mounted in the vicinity of a conductor rail, for producing a conductor-rail gap signal in conjunction with an evaluation device when a conductor rail is interrupted.

The advantages which can be achieved with the invention are in particular the fact that the detection of gaps in a conductor rail is carried out by using relatively simple provisions. An electronic evaluation of the current flowing across the current collector can be dispensed with. Use is made of the principle that a proximity switch or proximity sensor converts the movements of the current collector out of its position of rest into an electric or electronic signal. This can be triggered either at the current collector directly or even through the use of components which are connected to the current collector. Alternatively, the signals can be produced by a proximity sensor which is mounted on the vehicle, bogie or truck and directly detects an existing conductor rail.

Other features which are considered as characteristic for the invention are set forth in the appended claims.

Although the invention is illustrated and described herein as embodied in a configuration for detecting gaps in a conductor rail for electric rail vehicles being fed through conductor rails, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a fragmentary, diagrammatic, side-elevational view showing a principal configuration of a current collector for operating an electric rail vehicle on conductor rails;

FIGS. 2 and 3 are fragmentary, side-elevational views of two embodiments with proximity switches cooperating with current collectors for a conductor rail with which contact is to be made from below or from above.

DESCRIPTION OF THE PREFERRED EMBODIMENTS

Figure 4:
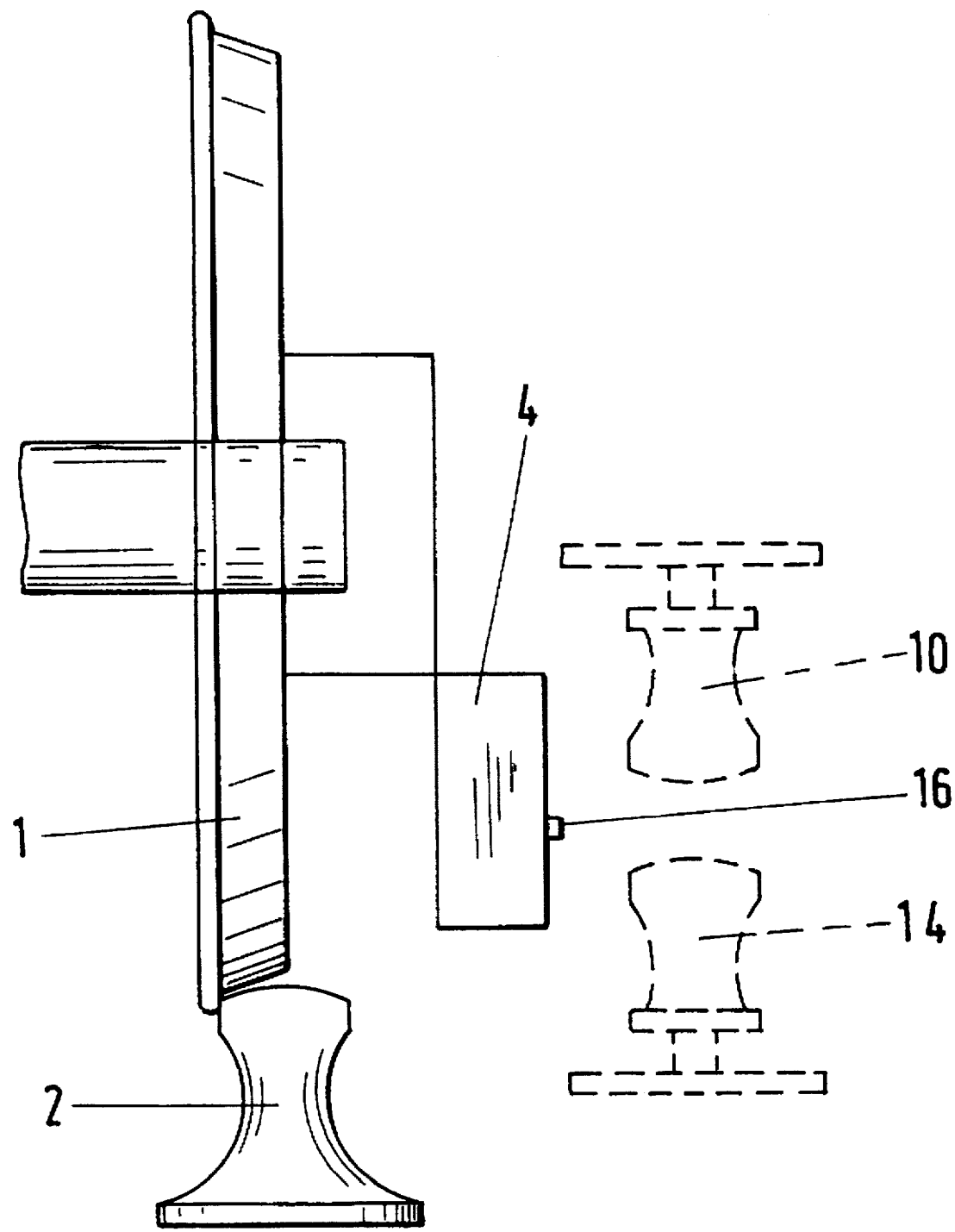
FIG. 4 is a fragmentary, side-elevational view of an embodiment with a proximity sensor.

Referring now to the figures of the drawing in detail and first, particularly, to FIG. 1 thereof, there is seen a principal configuration of a current collector for operating an electric rail vehicle on conductor rails. A vehicle wheel 1 resting on a running rail 2 of an electric rail vehicle, can be seen. A current collector 3 (current collector shoe) is mounted on a component 4 of the vehicle, bogie or truck. In order to permanently detect whether the current collector 3 is in electric contact with a conductor rail (illustrated in FIGS. 2 and 3) or whether an interruption in feeding of the power occurs as a result of a gap in the conductor rail, for example in the region of shunts or points, intersections and sectioning points while the rail vehicle is operating, a proximity switch or proximity sensor is provided. The exemplary embodiments described with regard to FIGS. 2 and 3 indicate in detail the way in which such proximity switches can be installed structurally within a region designated by reference symbol A in FIG. 1.

An embodiment with a proximity switch for a conductor rail with which contact is to be made from below is illustrated in FIG. 2. The current collector 3 with which contact is to be made with a conductor rail 10 has an angular lever or component 5 that is mounted at a right angle and an axis 6 of rotation which is provided at a bending point and about which the current collector 3 can pivot. In order to press the current collector 3 against the conductor rail 10 with a prescribed force, a spring element 8 which is supported against a securing bow 7 presses against the angular lever 5. The securing bow 7 is mounted on the component 4 of the vehicle, bogie or truck. Different positions of the angular lever 5 when the conductor rail 10 is present (current collector presses against the conductor rail) and when the conductor rail is interrupted (current collector in an end position) is used to detect gaps in the conductor rail. For this purpose, a proximity switch 9 is mounted on the securing bow 7 or on the component 4 of the vehicle, bogie or truck in the direct vicinity of the angular lever 5. When the conductor rail 10 is present, a gap is produced between the angular lever 5 and the proximity switch 9. When the conductor rail is interrupted, the spring element 8 presses the angular lever 5 against an activation element 9' of the proximity switch 9 so that the proximity switch 9 produces current-gap signals in conjunction with an energy supply unit and an evaluation unit 15.

An embodiment with a proximity switch for a conductor rail 14 with which contact is to be made from above is illustrated in FIG. 3. The structure is similar to the embodiment according to FIG. 2 with the distinction that the angular lever 5 of the current collector 3 is pressed against an activation element 13' of a proximity switch 13 by a spring element 12 which is supported against the component 4 of the vehicle, bogie or truck, and the proximity switch 13 is mounted in a securing bow 11. The securing bow 11 is attached to the component 4 of the vehicle, bogie or truck. The rest of the mode of operation is as explained above with regard to FIG. 2.

An embodiment with a proximity sensor is illustrated in FIG. 4. Again, a vehicle wheel 1 which rolls on the running rail 2 can be seen. The optional positions of the conductor rails 10, 14 to the side of the rail vehicle are indicated by broken lines. The current collector contacts the conductor rail 10 from below while the conductor rail 14 is acted on from above. A proximity sensor 16 in the vicinity of the conductor rail is mounted on a component 4 of the vehicle, bogie or truck in such a way that a conductor-rail gap signal can be produced in conjunction with an evaluation device 15, when there is an interrupted conductor rail. In this embodiment, the proximity sensor and the current collectors can be offset from one another spatially. Therefore, the proximity sensor detects a conductor rail directly without components of the current collector being involved in the detection.

Figure 5:
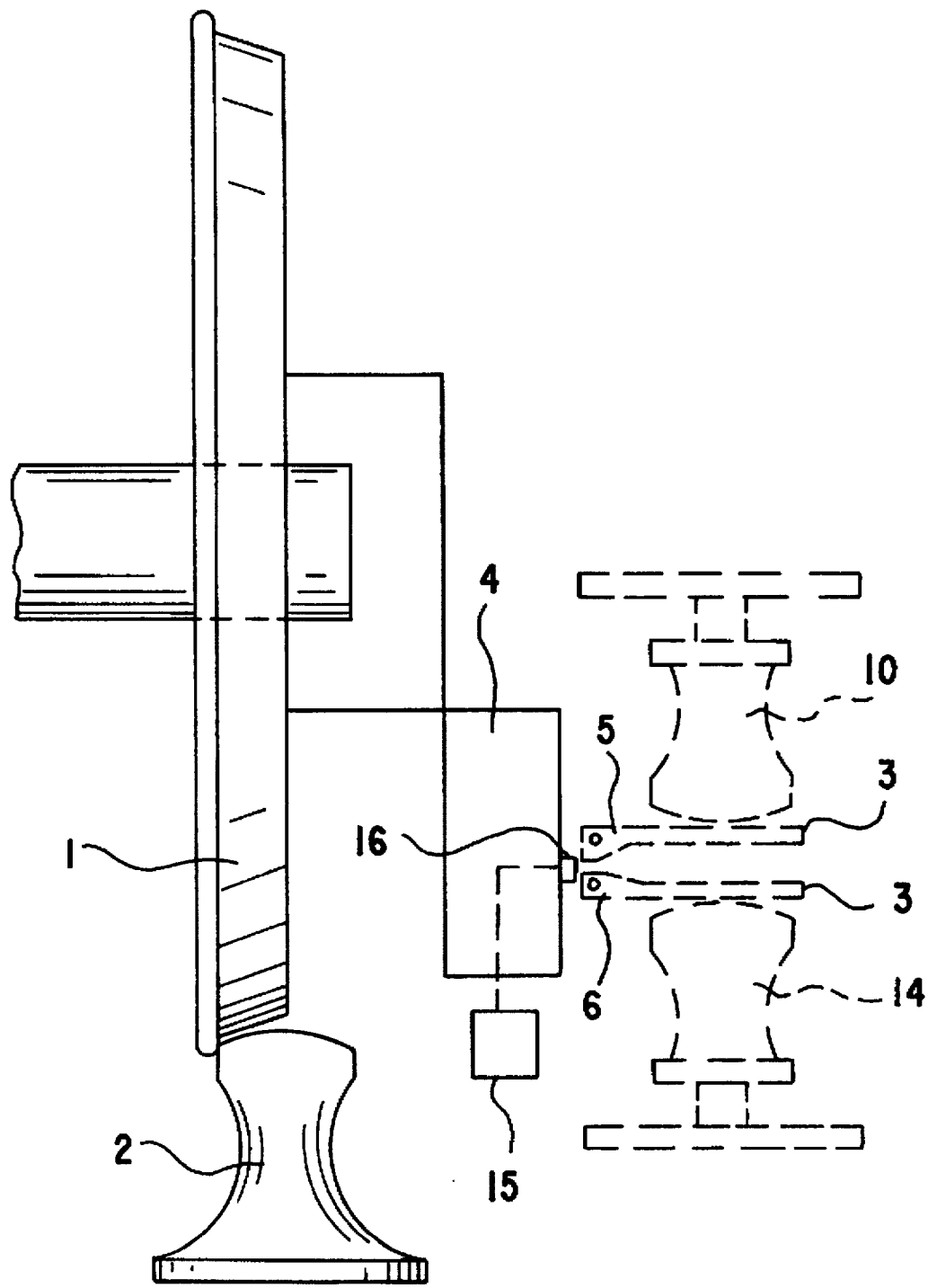
FIG. 5 is a fragmentary, side-elevational view of an embodiment with a proximity sensor cooperating with a current collector.

Of course, in the embodiments according to FIGS. 2 and 3 it is also possible to provide proximity sensors instead of proximity switches 9, 13. Such an embodiment is shown in FIG. 5 wherein a proximity sensor 16 senses movement of an angular lever 5 of a current collector 3 when it pivots about an axis of rotation 6 upon encountering an interruption in one of the conductor rails 10, 14.

We claim:

1. A configuration for detecting gaps in a conductor rail for electric rail vehicles being fed through conductor rails, comprising:

a current collector having a component, said component being an angular lever pivoting about an axis of rotation and a spring element for moving said angular lever;

a proximity sensor sensing movement of said component of said current collector if a gap is present in a conductor rail, for producing a conductor-rail gap signal when a conductor rail is interrupted;

a securing bow for connecting said proximity sensor to a component of a vehicle, bogie or truck; and an evaluation device connected to said proximity sensor.

2. A configuration for detecting gaps in a conductor rail for electric rail vehicles being fed through conductor rails, comprising:

a proximity sensor which being mounted in the vicinity of a conductor rail for continuously monitoring the conduct rail and, for producing a conductor-rail gap signal when a conductor rail is interrupted; and an evaluation device connected to said proximity sensor.

* * * * *